2,968,644
Patented Jan. 17, 1961

2,968,644

METHOD OF PRODUCING PHENOLIC RESINS SOLUBLE IN TRI-CHLOR-ETHYLENE

Lars Sten Robert Norrhede, Alvangen, Sweden
(% Dyfoam Corporation, New Castle, Pa.)

No Drawing. Filed May 2, 1957, Ser. No. 656,519

11 Claims. (Cl. 260—57)

My invention relates to the preparation of phenolic resins.

More particularly in my invention relates to the preparation of phenolic resins which are soluble in tri-chlor-ethylene.

Tri-chlor-ethylene has proved to be particularly suitable in the preparation of a liquid solution of an impregnating agent for heat insulations made of fibrous material, in particular insulations have a multilayer structure. As example I mention multilayer insulations made of paper and impregnated with asphalt or bituminous products. Tri-chlor-ethylene has an extremely high capacity of penetrating into the paper so as to cause the impregnating agent dissolved in tri-chlor-ethylene to reach the interior of the paper web. Further, tri-chlor-ethylene is capable of being recovered with a minimum of loss of heat because its evaporation heat is not more than one sixth of that of water. Among other advantages inherent to tri-chlor-ethylene is the absence of any danger of inflammation.

Phenolic resins when used as impregnating agents for fibrous materials and in particular organic fibrous materials, impart to the material an extremely high water resistance. Corrugated paper sheets in a multilayer insulation keep their corrugated profile after impregnation with phenolic resin in almost constant shape even when wet. Hitherto phenolic resins could not be used as impregnating agents for insulating material because they proved to be soluble only in water or alcohol as far as solvents are involved among those, which are available at reasonable price in the market.

Water solutions of phenolic resins have proved to be more or less incapable of introducing the impregnating agent into the interior of the fibrous sheet, for example webs of paper or an insulating board, though such thorough introduction is an indispensable condition for obtaining a perfect water resistance. Further the water solution of impregnating agent has a tendency of becoming concentrated towards the lower part of the insulating board, which results in an uneven distribution of the impregnating agent.

Phenolic resins dissolved in alcohol are also soluble in tri-chlor-ethylene, but then the presence of alcohol involves an intricate risk of inflammation. A further drawback is constituted by the fact that other suitable constituents of impregnating agents such as asphalt, cannot be used in combination with the phenolic resin. There is always the danger that the tri-chlor-ethylene, the alcohol and the water will combine so as to form a monophase system which under conditions impossible to be determined in advance is liable of being decomposed into its individual constituents. Phenolic resins modified with alcohol have even when finally cured a much more marked tendency to adsorb water or moisture than the types of finally cured phenolic resins dissolved in water.

It is also known in prior art to make phenolic resins soluble in tri-chlor-ethylene by modifying them with some natural resins, such as colophony resin, Chinese wood oil, for example. The modified resins obtained in this way have, however, a very poor water resistance.

I have now found that it is possible to prepare phenolic resins capable of being dissolved in tri-chlor-ethylene by causing phenol or one of its substitutes or derivatives, such as cresol or xylenol, either any of these substances alone or a plurality of them in a suitable co-mixture, to react in the heat with formaldehyde in the presence of tri-chlor-ethylene.

In order to ensure that the resin formed in this way is soluble in tri-chlor-ethylene I have found it to be important that the starting materials phenol, i.e. carbolic acid or its substitutes, derivatives or mixtures thereof in each charge have definite relations of weight to one another. The best results I have obtained with a proportion of molecular weight between phenol or its substitutes or derivatives and formaldehyde within a range between 0.55:1 and 0.75:1. The lower limit is about 0.4:1 and the upper about 0.9:1. Tri-chlor-ethylene should be present in a proportion of molecular weights within the range of approximately 0.65:1 and 0.8:1. As the solubility of the tri-chlor-ethylene in the finally prepared resin is dependent on the quantity thereof present during the reaction said quantity should not be less than given by the rate 0.4–0.5:1 calculated on the weight of the weight of the carbolic acid or substituted phenol.

To the mixture of liquids I add a suitable catalyst, in general concentrated ammonia in a ratio of about 30 grams to each 1000 grams phenol. As a suitable starting material I prefer to use formalin, a commercial 37% formaldehyde solution in water and methanol. The last mentioned constituent is contained in the liquid solvent in varying proportion according to the season within a range between 7 and 10% by weight. The methanol serves as a retarding agent the presence of which delays the synthesis of the molecular structure of the resin so as to permit control of the reaction in an effective manner. Without methanol present, the period of condensation lasts for between 10 and 30 minutes only, which practically makes any effective control of the condensation process impossible. Due to the methanol contents indicated above the period of condensation is prolonged so as to last for between 2 and 2.5 hours.

The most suitable molecular structure of the resin is determined by means of the refractive index of the resin under formation. According to the invention this index should be kept between the limits of 1.4800 and 1.5100, the optimum being at about 1.4900. The duration of the condensation period is thus determined so as to ensure that the resin formed thereunder attains a refractive index of the order of magnitude defined above. The minimum of the condensation period is about half an hour whereas the upper limit is determined only by the capacity of production in consideration. As the lowest value for the refractive index at the end of the condensation period for obtaining a resin suitable for the objects of my invention I have found 1.4650 and as the upper value 1.5250. When the refractive index desired is reached, the condensation is interrupted and is followed by distillation period during which the vessel within which the reaction had been made is subjected to an evacuation. Thereby I remove water which partly was contained in the aqueous solution of formalin and partly was separated as a result of the condensation reaction. Further any excess of tri-chlor-ethylene and formaldehyde is distilled off. Due to the low pressure said distillation can be performed at such low temperatures as between +25° C. and +40° C., said low temperature preventing the resin from becoming condensed any more. Its molecular structure thus remains unchanged during this distillation period. When the distillation is terminated the temperature will rise in the reaction vessel which continuously is subjected to the reduced pressure.

Thereupon a period of concentration sets in during which the molecular structure of the resin is hardly changed though its viscosity and consequently its refractive index are changed. The change in the refractive index is a result of the increased concentration. When the temperature has risen to between +50° C. and +60° C. which corresponds to a final refractive index of about 1.5450, the concentration period is finished. By changing the final temperature of this concentration period between +40° C. and +100° C. I reach a refractive index between 1.4700 and 1.7100. The finally prepared resin may at a temperature of +20° C. have a viscosity of about 200 centipoise and a content of solid material defined according to ASTM within the limits of 50 and 90%.

The resin obtained after the concentration period is soluble in tri-chlor-ethylene up to a ratio of between 15 and 20% by weight of the resin (calculated as a 100% resin).

I have found it to be essential in the production of a phenolic resin soluble in tri-chlor-ethylene that as starting material a pure resol is used which means a resin synthesized of only phenol or its substitute or derivative and formaldehyde in the presence of an alkaline catalyst and an excess of formaldehyde. The following condensation step is then carried out in the presence of the quantity indicated above of tri-cholr-ethylene which results in the desired solubility of the prepared resin in tri-chlor-ethylene.

It is immaterial for the solubility of the resin produced according to the invention in the tri-chlor-ethylene whether as starting material is used pure phenol (carbolic acid), a substituent for said pure phenol such as cresol or xylenol, or a mixture of pure and substituted phenols or a mixture of several types of substituted phenols. A mixture of cresol constituted by 30-32% metha-cresol and 60-58% ortho-cresol, and xylenol in a proportion 1:1 results in a phenolic lacker soluble in tri-chlor-ethylene. Though it corresponds to expectations that the optimum of water resistance of a paper insulation is obtained by means of an impregnation with a resin produced according to the invention using pure carbolic acid as the phenol and dissolved in tri-chlor-ethylene, I experienced the rather surprising observation that this optimum is only slightly reduced when said carbolic acid is more or less replaced by one or several of the substituents. Even when entirely replacing the phenol by cresol the waterproofness of the paper insulation impregnated with the product produced according to the invention, is still surprisingly high.

The following examples are intended to illustrate the invention more detailed, but the scope of the invention is not to be limited thereto.

Example 1

Into a double-walled vessel provided with an agitator and means for supply of heat and cold and with a reflux cooler and means to perform a distillation by applying reduced pressure down to about 20 millimetres Hg I fed subsequently 1150 grams of carbolic acid, 2000 grams of an aqueous solution of formaldehyde having a concentration of 37% and 37.5 grams of ammonia diluted by 40 grams of water. I agitated the constituents and measured continuously the rise in temperature caused by the reaction of said materials with one another. When the temperature had risen to 40° C. I added 1000 grams of tri-chlor-ethylene.

By supply of external heat I raised the temperature of the reaction mixture to its boiling point which is 78° C., and kept said temperature during a subsequent period of condensation until I attained the desired molecular structure which I ascertained by control of the refractive index. When operating with the mixture given above the refractive index corresponding to the desired molecular structure should be about 1.4900. When said index had been reached I cooled the distillate by means of reflux cooling. The length of the condensation period depended on the content of methanol in the formaldehyde. Said content being about 8.5%, the condensation period including the cooling step was about 2.5 hours. Thereupon I evacuated the vessel until I attained a reduced pressure of about 20 millimetres Hg. By said evacuation I expelled water and excess of tri-chlor-ethylene and formaldehyde. The temperature remained between 25 and 30° C. After about 3 hours the temperature within the vessel began to rise again. Said temperature reaching 60° C., I interrupted the concentration period and drew off the resin solution the refractive index of which then proved to be about 1.5450.

At 20° C. the resin obtained had a viscosity of about 200 centipoises and a content of solid substance measured according to ASTM of about 65%. It proved to be soluble in tri-chlor-ethylene up to 20% by weight calculated on a resin content of 100% in the solution. The stability of said solution proved to be capable of being improved by addition of a stabilizing agent such as stearic acid, for example, in a quantity of 7.5% calculated on the quantity of phenolic resin present in the solution.

Example 2

Into the vessel of Example 1 I fed 1000 grams of a cresol mixture containing 50° metha-cresol and the remainder ortho and para-cresol, 2000 grams of an aqueous solution of formaldehyde in a concentration of 37% and 30 grams of ammonia diluted by 30 grams of water. I agitated the mixture thereby starting the reaction of its constituents with one another and a rise of the temperature in the vessel. On reaching +40° C. I added 1000 grams of tri-chlor-ethylene and otherwise proceeded in the same manner as described in Example 1, interrupting, however, the condensation period when the refractive index had reached the value of 1.499. At the end of the distillation period said index was 1.5820.

Example 3

Into the reaction vessel of Example 1 I fed 500 grams of a mixture of 50% metha-cresol and 50% ortho and para-cresol, 1000 grams of carbolic acid in a concentration of 90%, 1500 grams of an aqueous solution containing 37% by weight of formaldehyde and 30 grams of ammonia diluted by 30 grams of water. By intensive agitation I intimately intermixed said constituents and caused them to react with one another until the temperature in the reaction vessel had risen to 40° C. whereupon I added 1000 grams of tri-chlor-ethylene. Subsequently I raised the temperature in the vessel to 78° C. which is the boiling temperature of the solution and kept said temperature unchanged during the following condensation period until I observed the refractive index for the condensation product having reached the value of 1.479. Thereupon I cooled the product by means of reflux cooling to room temperature. The condensation period including the cooling step lasted for about two hours. By evacuation the vessel was subjected to reduced pressure of about 20 millimetres Hg causing water and excess of tri-chlor-ethylene of formaldehyde to escape. During this distillation period the temperature remained between 25 and 30° C. When observing a more considerable rise in temperature I finished the concentration period and drained off the resin solution. At that moment the refractive index had reached the value of 1.5435.

The resin obtained proved to be soluble in tri-chlorethylene up to 18% by weight calculated on a resin content in the solution of 100%.

What I claim is:

1. A method of producing phenolic resins soluble in tri-chlor-ethylene which comprises the steps of: admixing a phenolic compound selected from the group consisting of phenol, mono- and di-methyl substituted phenols and mixtures thereof, with an aqueous solution of formaldehyde, the mole ratio of phenolic compound to formaldehyde ranging between about 0.4 to 1.0 and 0.9 to 1.0, together with a catalytic amount of ammonia, permitting the ensuing condensation reaction to continue exothermically until the temperature of the reactants rises to a temperature not exceeding 40° C. thereupon adding to the reactant mixture tri-chlor-ethylene, the mole ratio of tri-chlor-ethylene to phenolic compound being larger than 0.4 to 1.0, and thereafter continuing the reaction until the condensation product has a refractive index between about 1.4650 and 1.5250.

2. A method as claimed in claim 1 in which the starting phenol material is carbolic acid.

3. A method as claimed in claim 1 in which the starting phenol material is a cresol.

4. A method as claimed in claim 1 in which the starting phenol material is a xylenol.

5. A method as claimed in claim 1 in which the starting phenol material is a mixture of carbolic acid and at least one methyl substituted phenol.

6. A method as claimed in claim 1 in which as the starting phenol material a mixture of methyl substituted phenols is used.

7. A method as claimed in claim 1 in which a minor amount of methanol is present in the mixture as a retarding agent.

8. A method as claimed in claim 1 in which the mole ratio of tri-chlor-ethylene to phenolic compound ranges between 0.65 to 1.0 and 0.8 to 1.0.

9. A method as claimed in claim 1 in which the mole ratio of tri-chlor-ethylene to phenolic compound is about 0.72 to 1.0.

10. A method as claimed in claim 1 in which the mole ratio of phenolic compound to formaldehyde ranges between 0.55 to 1.0 and 0.75 to 1.0.

11. A method as claimed in claim 1 in which the mole ratio of phenol to formaldehyde is about 0.62 to 1.0.

References Cited in the file of this patent

UNITED STATES PATENTS

| | | |
|---|---|---|
| 2,441,860 | Whetstone | Mar. 18, 1948 |
| 2,545,692 | Gleim | Nov. 20, 1951 |

FOREIGN PATENTS

| | | |
|---|---|---|
| 655,265 | Great Britain | July 18, 1951 |
| 131,675 | Australia | Mar. 8, 1949 |
| 365,286 | Germany | Dec. 14, 1922 |